United States Patent
Slat et al.

[11] Patent Number: 5,676,267
[45] Date of Patent: *Oct. 14, 1997

[54] MULTI-LAYER CONTAINERS

[75] Inventors: William A. Slat, Brooklyn, Mich.; Richard C. Darr, Seville, Ohio

[73] Assignee: Plastipak Packaging, Inc., Plymouth, Mich.

[*] Notice: The term of this patent shall not extend beyond the expiration date of Pat. No. 5,464,106.

[21] Appl. No.: 455,557

[22] Filed: May 31, 1995

Related U.S. Application Data

[63] Continuation-in-part of Ser. No. 271,088, Jul. 6, 1994, Pat. No. 5,464,106.
[51] Int. Cl.$^6$ ................................................. B65D 23/02
[52] U.S. Cl. ..................... 215/12.1; 220/454; 264/513; 264/515
[58] Field of Search ...................... 215/12.1, 12.2, 215/373, 375, 40; 264/512, 513, 515; 220/454

[56] References Cited

U.S. PATENT DOCUMENTS

| | | | |
|---|---|---|---|
| 4,954,376 | 9/1990 | Krishnakumar et al. | 215/12.1 X |
| 4,990,382 | 2/1991 | Weissenstein et al. | 215/12.1 X |
| 5,077,111 | 12/1991 | Collette | 215/12.1 X |
| 5,102,705 | 4/1992 | Yammoto et al. | 428/369 X |
| 5,250,333 | 10/1993 | McNeely et al. | 428/35.7 |
| 5,281,360 | 1/1994 | Hong et al. | 428/358 |
| 5,320,230 | 6/1994 | Hsiung | 215/375 |
| 5,464,106 | 11/1995 | Slat et al. | 215/373 X |

*Primary Examiner*—Allan N. Shoap
*Assistant Examiner*—Christopher J. McDonald
*Attorney, Agent, or Firm*—John P. Guenther; Robert H. Bachman

[57] ABSTRACT

A multi-layer preform for forming multi-layer containers includes an extruded inner barrier layer containing polyethylene naphthalate, said inner layer having an upper portion adapted to be formed into an upper portion of a container, an intermediate portion adapted to be formed into an intermediate portion of a container, an extruded and a base portion adapted to form a base portion of a container. The preform includes an outer injection molded layer. The inner layer has a thickness which differs from the base portion to the upper portion.

18 Claims, 6 Drawing Sheets

MULTI-LAYER CONTAINERS

CROSS-REFERENCE TO RELATED APPLICATION

This application is a Continuation-In-Part of application Ser. No. 08/271,088, filed Jul. 6, 1994, U.S Pat. No. 5,464,206.

BACKGROUND OF THE INVENTION

This invention is directed toward containers and container preforms, and more particularly to multi-layer containers and multi-layer container preforms.

Multi-layer containers are typically manufactured for allowing the use of different materials in each of the layers, wherein each material has a specific property adapted to perform the specific function of the layer. The multi-layer containers are manufactured in a variety of ways as represented in the following devices and methods.

For example, U.S. Pat. No. 4,741,936 discloses a laminated preform for a multi-layer polyester bottle. In forming the preform, the process includes forming by co-extrusion a pipe having inner and outer layers of polyester composed mainly of ethylene terephthalate units and an intermediate layer of an oxygen-barrier resin interposed between the inner and outer layers. An adhesive resin is also preferably interposed between adjacent layers. The thickness of the layers of the multi-layer pipe are sized to be uniform. The process for forming the preform includes cooling the outer portion of the molten multi-layer pipe by contact with water and simultaneously introducing an inert gas into the interior of the pipe to cool the inner portion. The pipe is later draw-formed into a multi-layer drawn bottle. The multi-layer bottle disclosed in U.S. Pat. No. 4,741,936, while including a plurality of layers having different properties for different functions, discloses no process or device for causing thickness variations at selected portions of the bottle and on selected layers. Accordingly, the thicknesses at each portion of the bottle are limited by the feasibility of the same thickness at other portions, thereby decreasing the usefulness of the container.

U.S. Pat. No. 4,646,925 discloses a multi-layer preform for draw forming a bottle which is formed by injection molding. The preform includes a neck portion having an open end and a part for engagement with a lid member. It further includes a thick barrel portion to be drawn and a closed bottom portion, wherein the neck portion and the inner wall of the bottom and barrel portions are integrally formed of a thermoplastic polyester. A thin intermediate layer composed of a gas-barrier thermoplastic resin is formed on the inner walls of the barrel and bottom portions so that the top end of the intermediate layer is extended to a point just below the neck portion. An outer layer of thermoplastic polyester is formed in such a positional relation so that the outer layer covers the intermediate layer. A joint is formed directly on the intermediate layer between the outer layer and the neck portion just below the neck portion. Being that the preform is formed by injection molding, thickness variation is directly dependent upon the shape of the mold. Therefore, a particular thickness design cannot be formed unless a new mold is also formed thereby decreasing the freedom for thickness variation for facilitating different functions.

Because the different portions of containers perform different functions, it is often desirable to vary the thickness of the container walls at the specific portion depending upon its function. For example, where a portion of a container is used for supporting the entire container, a thicker wall thickness might be preferred for additional strength. However, such additional thickness may not be desirable in other portions of the container, such as the sidewalls, due to such factors as desired flexibility, transparency and efficiency in material use. Therefore, for single-layer and multi-layer containers, it is often desirable to vary the thickness of the various layers at different portions of the container.

U.S. Pat. No. 3,869,056 discloses a multi-layered hollow plastic container. The container disclosed has an inner thermoplastic layer and an outer pressure molded layer. The container also has an integral open neck or rim portion wherein the thickness of the layers at the neck and rim portion are greater than the thickness of the layers in the remainder of the container. At the upper end of the container, the inner layer of the container overlaps the outer layer of the container at the neck or rim portion. While this patent discloses a container having variable thickness at the neck portion in comparison to the remaining portions of the container, such variable thickness is not applicable to other portions.

There exists a need, therefore, in the container manufacturing art, for a preform and container having multiple layers of material wherein the layers are subject to high accuracy thickness variability for serving the function of specific portions of the container and a process for accomplishing the same. There also exists a need to provide such a preform and container with desirable properties, as heat resistance, oxidation resistance and $CO_2$ resistance, at a reasonable cost and in a simple and convenient manner.

SUMMARY OF THE INVENTION

The primary object of the present invention is to provide a preform and container formed from multiple layers and desirably wherein at least one layer has varied thicknesses for different portions of the container.

Another object of this invention is to provide a preform for forming a container which is highly convenient for recycling and which has desirable properties, as heat resistance, oxidation resistance, and $CO_2$ resistance, at a reasonable cost and in a simple and convenient manner.

Yet another object of this invention is to provide a preform and container having multiple layers wherein the inner layer is of minimal thickness for material saving purposes but variable in thickness at different portions of the container for accomplishing different functions.

Still another object of this invention is to provide a multi-layer preform and container wherein each layer has a specific function such as a barrier layer, a contents contact layer, and an outer layer.

The foregoing objects are attained by the inventive, heat resistant multi-layer preform for forming multi-layer containers of the present invention, wherein the preforms include an extruded inner barrier layer forming a cavity and containing polyethylene naphthalate (PEN), said inner layer defining an upper portion which is adapted to form an upper portion of a container. The inner layer also includes an extruded intermediate portion adjacent the upper portion which is adapted to form an intermediate portion of the container. The inner layer also includes an extruded base portion adjacent the intermediate portion which is adapted to form a base portion of the container. The preform also includes an injection molded outer layer located substantially adjacent the inner layer, wherein the outer layer comprises the major portion of the thickness of the container. In one embodiment, the inner layer is a multi-layered laminate including a central PEN barrier layer and an innermost layer of at least one additional material, wherein the barrier and innermost layers are co-extruded.

The heat resistant, multi-layer container formed by the preform described above includes an extruded inner barrier layer containing polyethylene naphthalate, said inner layer forming a cavity and defining an upper portion, an intermediate portion and a base portion; and an outer injection molded layer located substantially adjacent the inner layer and substantially coextensive therewith; wherein the outer layer comprises the major portion of the thickness of the container; and wherein the inner and outer layers are blow molded. The container also desirably includes a footed base wall portion formed from at least the inner layer and the outer layer of material, although the present invention is not restricted to a footed base and the container may have other base configurations, as for example, a rounded base.

The container formed from the preform of the present invention has highly advantageous properties. Thus, the container is characterized by excellent heat resistance, oxygen resistance and $CO_2$ resistance. The combination of an extruded inner layer and injection molded outer layer enables one to adjust the thickness of various portions of the container as desired. Thus, for example, one can easily obtain a container with a thicker base portion. Moreover, one can readily obtain an oriented container with control over the amount of orientation due to the extrusion procedure. Also, one can obtain a lighter container with improved properties over comparable heavier containers. One can also use one shape preform for a variety of different shaped containers and with different orientation. Further, the container can be prepared using conventional equipment.

The details of the present invention are set out in the following description and drawings wherein like reference characters depict like elements.

DETAILED DESCRIPTION OF THE PREFERRED EMBODIMENT

Figures 1, 1A, 1B, 1C, 3A:
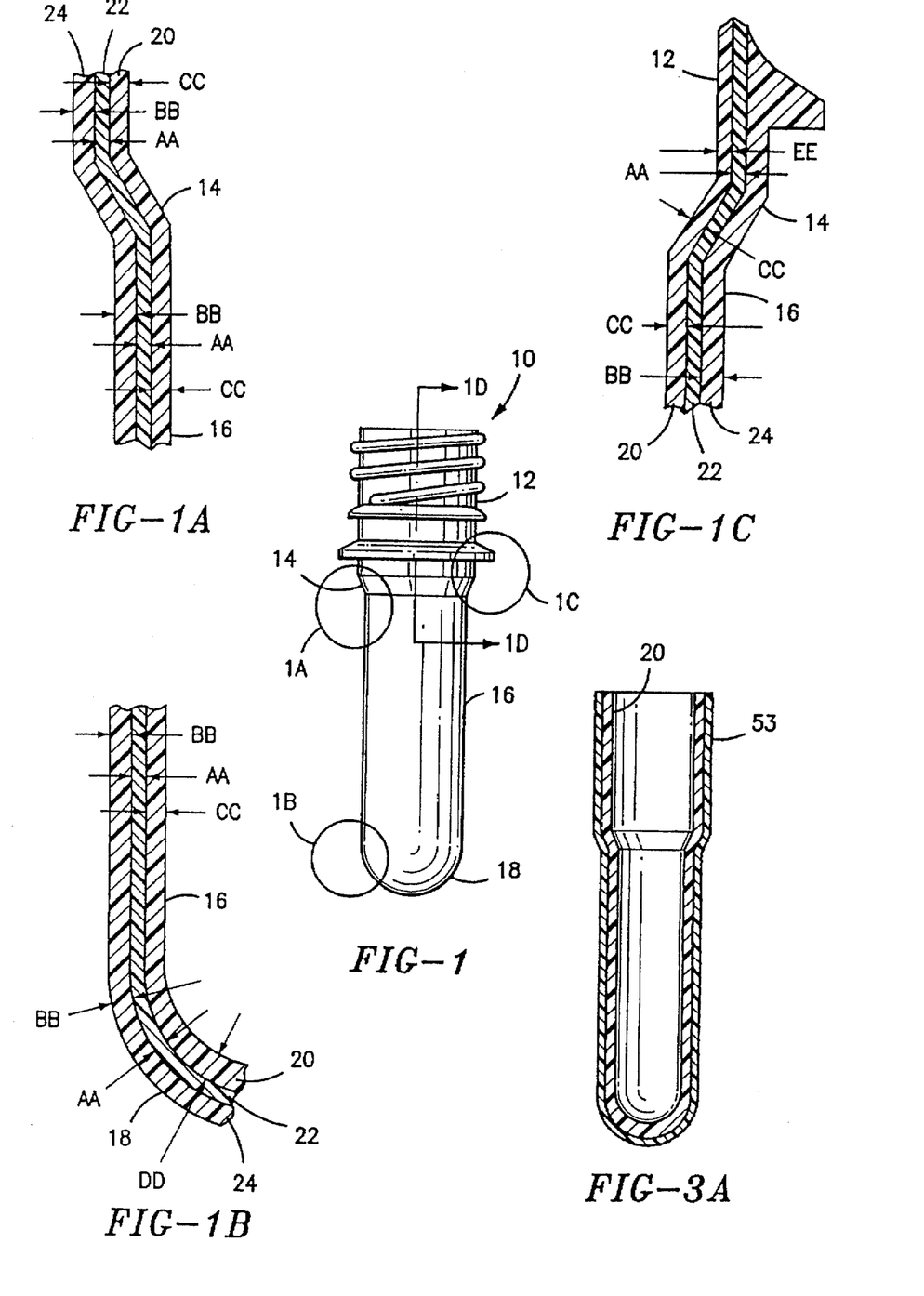
FIG. 1 is an elevational view of a preform in accordance with the principles of the present invention.
FIGS. 1A, 1B and 1C are enlarged cross-sectional views of various areas of the preform of FIG. 1, showing relative changes in layer thickness between different areas of the preform.
FIG. 3A is an elevational and cross-sectional view of a preform liner after the extrusion, blow molding and cutting process steps are performed as shown in FIGS. 2
Figures 4, 4C:
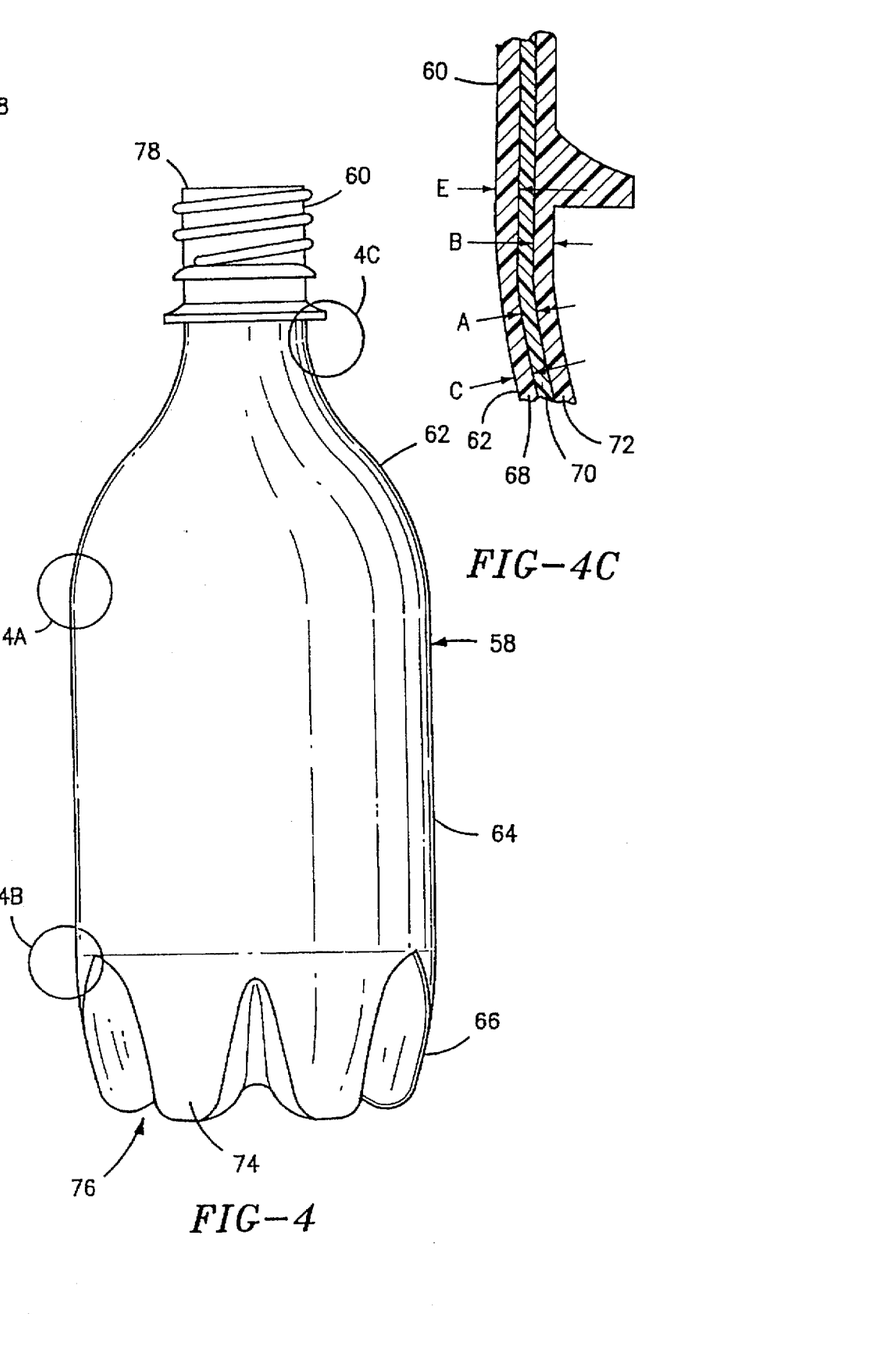
FIG. 4 is an elevational view of a container in accordance with the process steps of FIG. 2 and the principles of the present invention.
FIGS. 4A, 4B and 4C are cross-sectional and enlarged views of various areas of the container wherein the relative thicknesses of the layers forming the container are shown.

Referring now to the drawings in detail, wherein like reference numerals and letters designate like elements, there is shown in FIG. 1 an elevational view of a preform, in accordance with the principles of the present invention, designated generally as 10. Preform 10 typically includes a threaded and flanged upper portion 12, an angled intermediate portion 14, a vertical intermediate portion 16 and a base portion 18. In the configuration as shown in FIG. 1, preform 10 is adapted to be blow molded into a container, a preferred embodiment of which is shown in FIG. 4, in accordance with the principles of the present invention.

Referring now to FIG. 1A, preform 10 is preferably formed from three layers of material, with the inner layer desirably being a multi-layered laminate and including an encircling innermost layer 20, an encircling central polyethylene naphthalate barrier layer 22, and the preform including an encircling outer layer 24. If desired, the inner layer may be a single layer of polyethylene naphthalate or may consist essentially of polyethylene naphthalate or comprise a blend of PEN with one or more other materials. As can be seen from FIGS. 1A–1C, the thicknesses of the inner layer varies in accordance with specific portions of preform 10. In the three-layer embodiment, polyethylene naphthalate barrier layer 22 and outer layer 24 maintain a constant thickness AA and BB, respectively, substantially over the entire body of preform 10. Outer layer 24 varies in thickness at threaded and flanged upper portion 12. Innermost layer 20 varies in thickness depending upon the portion of the bottle, i.e., threaded and flanged upper portion 12, angled and vertical intermediate portions 14 and 16, and base portion 18.

Innermost layer 20 and barrier layer 22 are coextruded via an extrusion process discussed below, and outer layer 24 is formed onto the extruded layers via an injection molding process, which allows the formation of the threaded upper portion 12. As a result of the extrusion process, innermost layer 20 can be controllably adjusted in thickness based upon the functions to be performed by the various portions comprising preform 10 and the container. If polyethylene naphthalate or a blend containing PEN is the sole inner layer, naturally the polyethylene naphthalate can be controllably adjusted in thickness.

Variations in thickness of the inner layer are desirable for several reasons which include aesthetics, efficient material use and reduced costs, and variable strength requirements. Efficient material use is evident in innermost layer 20 at upper portion 12, where innermost layer 20 is thinnest. Strength considerations are evident in base portion 18, where additional support is required and as a result, innermost layer 20 is thickest.

Referring now in detail to FIGS. 1A–1C, which represent enlarged detailed views of areas 1A, 1B and 1C, respectively, of FIG. 1, innermost layer 20 is preferably formed from polyethylene terephthalate (PET) or PEN or a blend containing PEN. PEN, if FDA approved for use as an inner containment contact layer, or a blend containing PEN, is the preferred material and may if desired be used as the sole inner layer, i.e., a two-layer preform. Central barrier layer 22 is formed from PEN or a blend containing PEN if the innermost layer is PET; however, one may also use one or more other barrier layers, as saran and ethylene vinyl alcohol copolymers (EVOH) or acrylonitrile copolymers, such as Barex 210, as additional layers inside the outer layer or blended with the PEN. If a blend with PEN is used, one should preferably use at least 25% PEN in the blend. The term saran is used in its normal commercial sense to contemplate polymers made for example by polymerizing vinylidene chloride and vinyl chloride or methyl acrylate. Additional monomers may be included as is well known. Vinylidene chloride polymers are the most commonly used, but other oxygen barrier materials are well known.

As shown in FIG. 1A, the thickness of innermost layer 20 at the intermediate portions is indicated as CC. Thickness CC is of medium thickness in comparison to the upper and base portions. At the intermediate portions 14 and 16, the medium thickness layer is used because this portion of the preform wall is to be used for containment purposes, but not for support. Referring now to FIG. 1B, the thickness of inner layer 20 is shown for base portion 18 as DD. The thickness DD is larger than the thickness CC, wherein thickness DD has a thickness increase over thickness CC of approximately 25–50%. Larger thickness DD is preferable for base portion 18 in that base portion 18 is used to support the container (shown in FIG. 4) formed by preform 10. Base portion 18 is desirably formed into a footed support (shown in FIG. 4), and therefore is necessarily thicker for withstanding the weight of the container and its contents. With reference to FIG. 1C, innermost layer 20 is also shown to have a thickness CC until it reaches threaded upper portion 12 of preform 10. At threaded upper portion 12, innermost layer 20 has a thickness of EE which is less than thickness CC, having a thickness decrease from thickness CC of approximately 25–50%. Because of the lack of containment or other support required at threaded upper portion 12, it is preferable here that thickness EE is used, which saves on material usage.

In FIGS. 1A–1C, polyethylene naphthalate barrier layer 22 and outer layer 24 are shown to have constant thicknesses of AA and BB, respectively. Thickness of barrier layer 22 because it is co-extruded with innermost layer 20, can be altered as well. However, this is generally not required since barrier layer 22 acts only as a substance barrier and not as a means for support and a uniform barrier thickness is sufficient to act as the barrier regardless of the thicknesses of other layers. Thickness BB of outer layer 24, is determined by an injection mold (shown schematically in FIG. 2B) and again, typically is of a uniform thickness over the entire preform 10. Outer layer 24 is typically used for structurally altering the preform, such as the thread formation for capping, and subsequently the container (shown in FIG. 4), and also for aesthetics such as to provide color or insignia to the container.

Figure 1D:
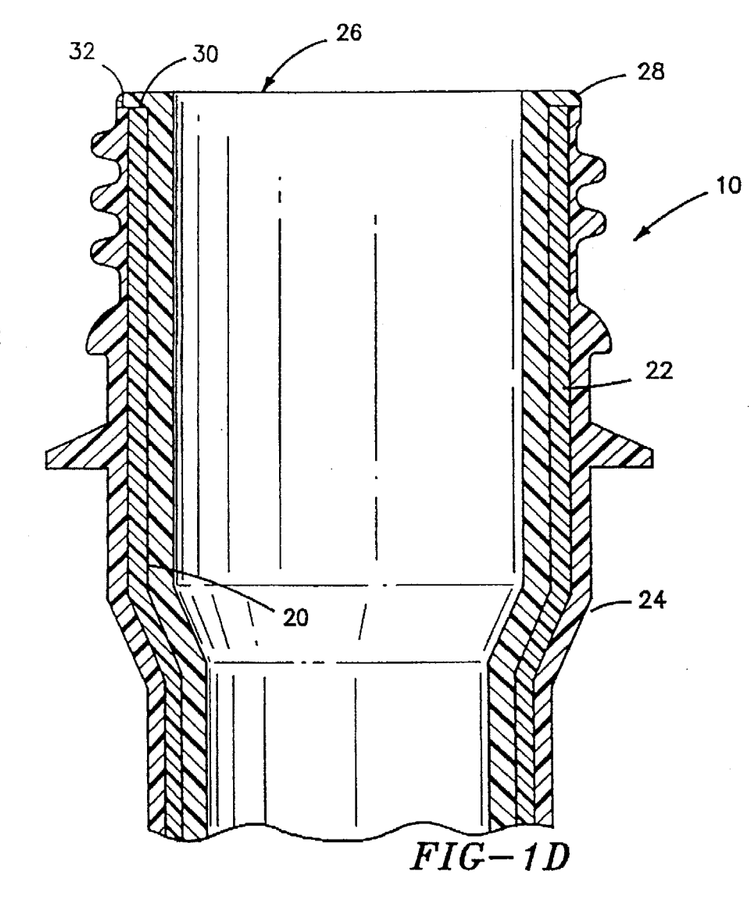
FIG. 1D is an enlarged cross-sectional view of the top end of the preform of FIG. 1, in accordance with the principles of the present invention.

An enlarged and cross-sectional view of threaded upper portion 12 of preform 10 is shown in FIG. 1D. As can be seen by referring to the top open end 26 of preform 10, innermost layer 20 preferably includes lip 28, extending substantially transversely to the remainder of the innermost layer 20, which extends over the top edges 30 and 32 of PEN barrier layer 22 and outer layer 24, respectively. The lip configuration and its relation to the PEN barrier layer 22 and outer layer 24 is formed in the process discussed below, i.e., a combination of extrusion and injection molding steps. Lip 28 is formed for maintaining inner layer 20 as the only layer which contacts the contents held in the container (shown in FIG. 4), even during the removal of the contents from the container, for example, via pouring.

Figure 2A:
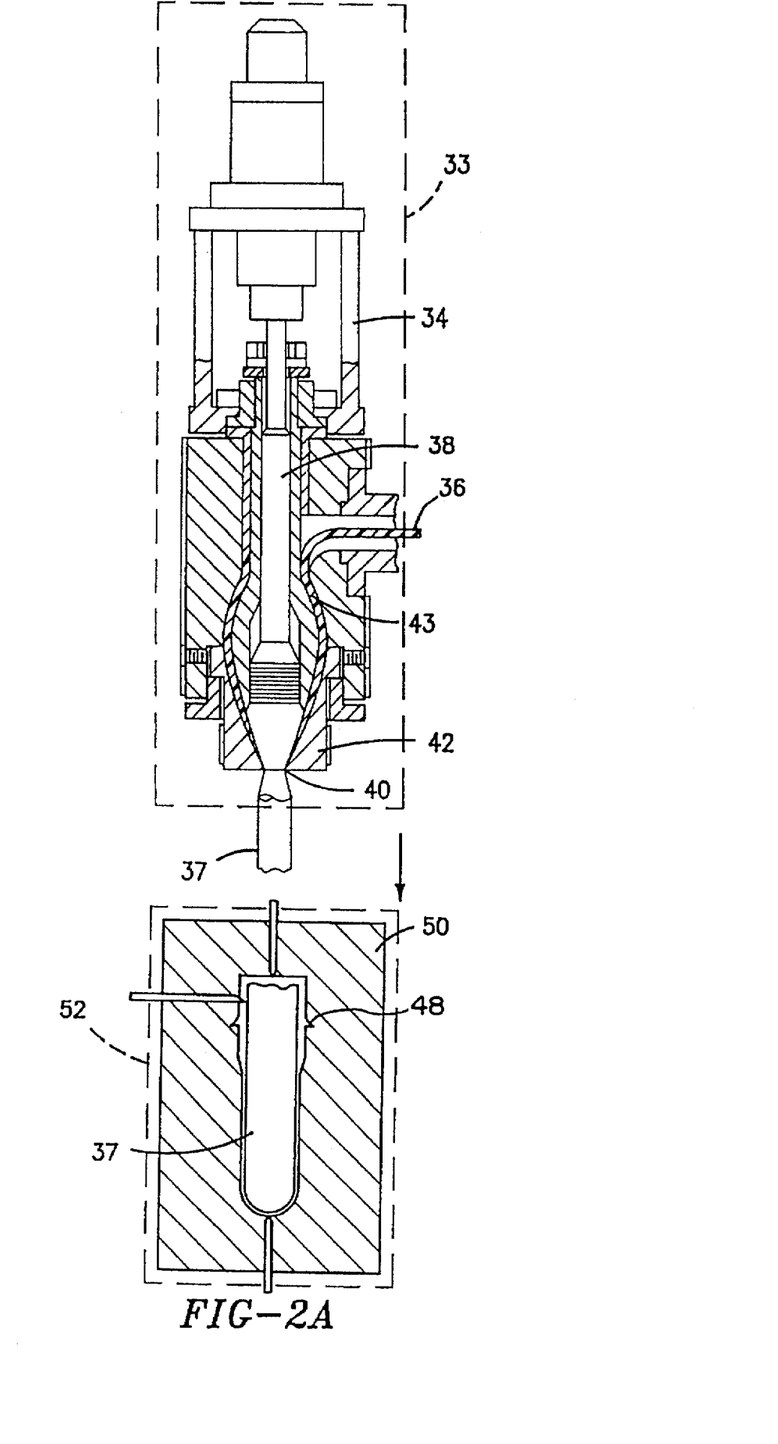
FIGS. 2A and 2B are a simplified representation of the process for forming the preform showing an extrusion step, a blow molding step, a cutting step and an injection molding step in accordance with the principles of the present invention.
Figure 2B:
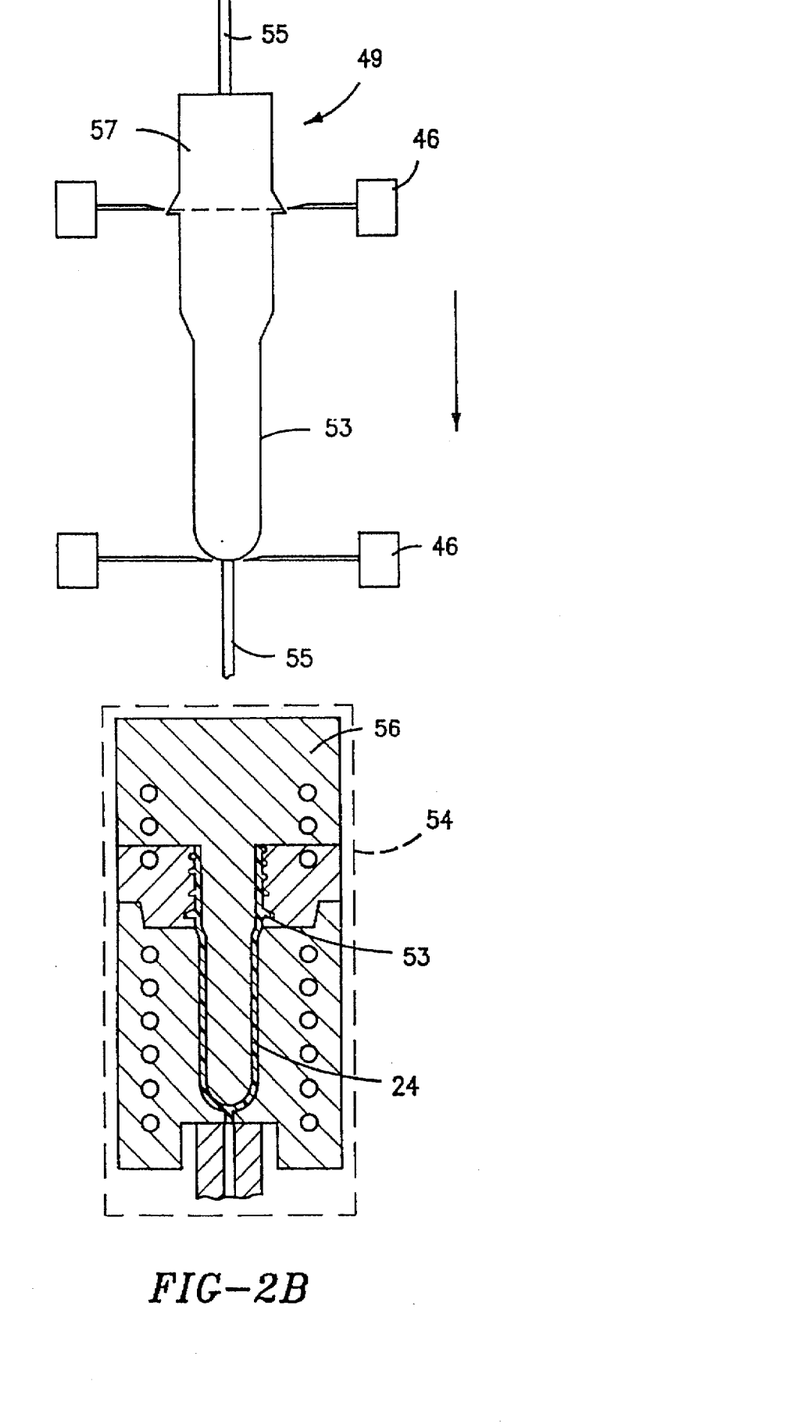

With reference to FIG. 2A and 2B, the process for forming preform 10 will be described. In forming preform 10, innermost layer 20, if used, and PEN barrier layer 22 (see FIG. 1) are extruded via an extruder 33 and extruder head 34. Accordingly, melt 36 is formed into a substantially cylindrically shaped member 37 used for forming the cylindrical wall portion of preform 10. For varying the thickness of the upper, intermediate, and base portions of preform 10, a melt thickness adjustment device 38 is used with extruder head 34. Adjustment device 38 is preferably in the form of a die pin stem designed for reciprocal motion and positioned in adjacent relationship with the exit area 40 of melt 36 through die bushing 42. By reciprocally moving die pin 38, the thickness of the wall forming the cylindrically shaped member 37, specifically innermost layer 20 (see FIG. 1) thereof, can be achieved. However, depending upon the design of extruder head 34, barrier layer 22 (see FIG. 1) can also be co-extruded with innermost layer 20 and have thickness variations along the portions comprising preform 10, so as to efficiently use the material comprising the barrier layer. Additionally, die bushing 42 may be adjustable in the direction substantially transverse to melt flow for achieving inner layer 20 thicknesses which are non uniform in the circumferential direction. That is, portions of the innermost layer 20 located on the same circumferential line could have different thicknesses.

The preforms of the present invention may be formed in any desired plastic preform and blow molding machine for forming a plurality of preforms and blow molding same. For example, plastic blow molding machines of the wheel type may be readily employed such as disclosed by U.S. Pat. Nos. 3,310,834, 3,764,250, 3,986,807 and 5,240,718. These have previously included a wheel having a frame supported on a base for rotation about a horizontal axis with a plurality of mold stations mounted on the wheel frame about the rotational axis such that a pair of mold supports for respectively mounting a pair of mold portions move parallel to the rotational axis between open and closed positions of the mold. Such machines conventionally include a closing station where the mold supports move the mold portions to a closed position to enclose an extruded hot plastic parison within a mold cavity for blowing to the shape of the mold and for subsequent cooling prior to opening at an opening station at an appropriate revolution of the wheel. By varying the speed of the wheel in relation to the extrudate from the extrusion head, axial orientation can be imparted to the parison. It is advantageous to obtain axial orientation of the parison in order to obtain desired properties from PET, PEN and/or blends of PET/PEN for different applications. The amount/rate of stretch can be customized and computer-controlled to suit different applications.

The extrudate, cylindrically shaped member 37 exits extruder head 34 in one continuous length. Accordingly, member 37 must be cut into lengths which are suitable for forming a particular size container. Such cutting is accomplished by a cutting device (not shown) positioned in the course of blow molding after extruder head 34.

As discussed previously for the FIG. 1D description, innermost layer 20 of preform 10 may optionally include lip 28 which extends over outer layer 24 and barrier layer 22. Lip 28 is formed via the combined efforts of the extruder 33 (shown in dotted lines) and extruder head 34 and subsequent trimming of the extrudate 37 after it is ejected from blow mold 50. The trimming is performed via a cutting device 46, shown in FIG. 2B.

By controlling reciprocating die pin 38 and moving the same in and away from die bushing 42 and exit area 40, the thickness of member 37 can be varied along the length thereof to acquire thickness ratios as previously described. As shown in FIG. 2A, member 37 is caused to exit the extruder head 34 and is directed into a blow molder 52 where a circumferential ridge 48 is formed thereon via the shape of blow mold 50. While in blow mold 50, extrudate member 37 is formed via blow molding into molded member 49 shown in FIG. 2B. The molded member 49 may also be formed by a blow mold such that the member is formed from two liners connected end to end, having ridge 48 in the middle. Molded member 49, having the appropriate thicknesses, is then cooled to the proper temperature and ejected from blow mold 50 of blow molder 52. During the blow molding process, the ends of molded member 49 are sealed resulting in excess plastic 55. In addition, portion 57 extends beyond the would be length of preform liner 53 and is used for assisting the cutting of molded member 49 for forming ridge 48. Cutting device 46 is used to trim excess material 55 and portion 57 from molded member 49 in a subsequent cutting operation for forming preform liner 53. By cutting top portion 57 off molded member 49, lip 28 is formed for extension over the outer layer to be formed in a subsequent injection molding process.

Figure 3B:
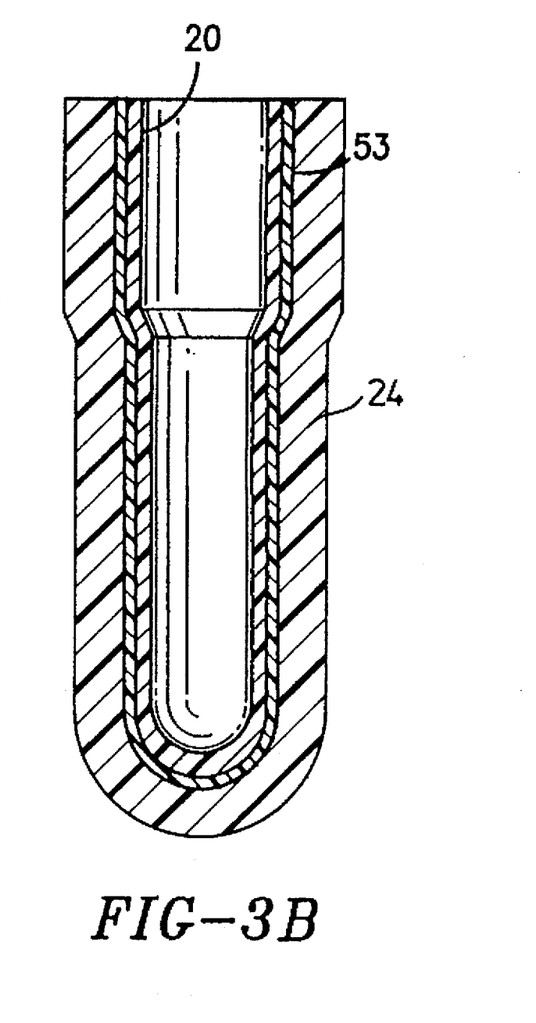
FIG. 3B is an elevational and cross-sectional view of the finished preform.

After liner 53 is formed into the shape as shown in the embodiment of FIG. 3, via blow molder 52, liner 53 is moved into an injection molder 54, shown by dotted lines in FIG. 2B, having an injection mold 56 for forming outer layer 24 (see FIG. 1) over liner 53. Accordingly, injection mold 56 is in the shape of preform 10, shown in FIG. 1. Injection molder 54 injects outer layer 24 over liner 53 for finishing the formation of the preform as shown in the embodiment of FIG. 3B. As discussed above, the melt used to form outer layer 24 is preferably recycled PET and is adapted to be used for forming aesthetic features such as color and surface designs, and functional features such as threads and flanges. However, as discussed above, with the exception of upper threaded portion 12, the thickness of outer layer 24 as formed by injection molder 54 is maintained as uniform thickness BB (see FIGS. 1). By maintaining this thickness uniform, the preform can be much more easily removed from injection mold 56.

Figure 4A:
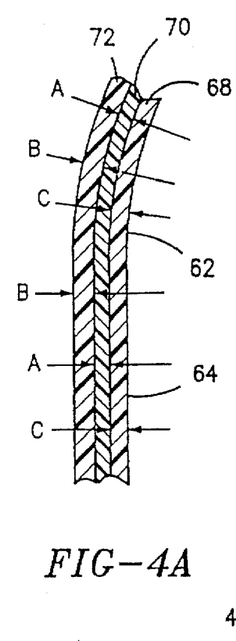

With reference now to FIG. 4, a container 58 is shown which is formed from preform 10 (see FIG. 1) via a blow molding operation, to be discussed below. Similar to the preform, container 58 includes a threaded upper portion 60, an angled intermediate portion 62, a substantially vertical intermediate portion 64 and a base portion 66, which is shown in the embodiment of FIG. 4 as a footed base. As shown in FIG. 4A, container 58 also has three layers of material, having properties and relative thickness relationships differing, however, from the layers of materials described for preform 10 in FIG. 1.

Figure 4B:
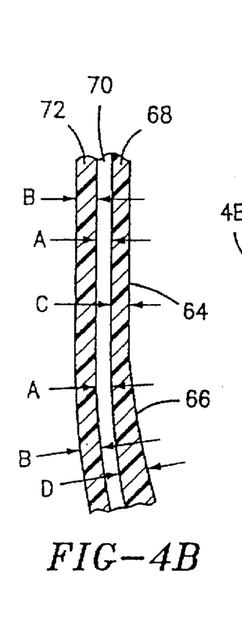

Referring to FIGS. 4A–4C, which represent enlarged detailed views of areas 4A, 4B and 4C, respectively, of FIG. 4, container 58 includes innermost layer 68, central PEN barrier layer 70 and outer layer 72. Because innermost layer 68 is not subject to blowing at the neck region, as discussed below, in forming the container shape, the thickness ratios between the various portions of the container differ from those discussed above for inner layer 20 of preform 10 (see FIG. 1). FIGS. 4A, 4B, and 4C correspond to FIGS. 1A, 1B and 1C of preform 10 and thicknesses A–E correspond to thicknesses AA–EE. As shown in FIG. 4A, innermost layer 68 has a thickness of C at angled and vertical intermediate portions 62 and 64, respectively. Thickness C is thinnest with regard to the thicknesses at the other portions. Referring to FIG. 4B, innermost layer 68 has a thickness of D, thicker than thickness C at the footed base portion 66 so as to strengthen this support area of container 58. Thickness D of the innermost wall at base portion 66 is typically substantially equal to thickness E at the upper threaded portion 60. However, this relationship may vary depending, at least partly, on the size of the container, which could cause thickness D to be thicker or thinner than thickness E. In footed base portion 66, if a footed base is used, innermost layer 68 is formed into a plurality of circumferentially positioned feet 74 whose function is to sturdily support container 58 on a flat surface. Feet 74 extend circumferentially around the lower end 76 of container 58. Each foot 74 is defined by an indent on each vertical side thereof, each of which extends from a central area of the bottom of container 58 upwardly on the circumference of container 58 toward top end 78 of container 58. Due to the increased thickness of innermost layer 68 which forms footed base 66, feet 74 are substantially harder and less flexible than intermediate portions 62 and 64.

Referring now the FIG. 4C, in the threaded upper portion 60, corresponding directly with threaded upper portion 12 of preform 10 (see FIG. 1), innermost layer 68 has a thickness E which is thicker than thickness C of the intermediate portions because it was not subject to blow molding. As discussed above for preform 10, and as shown in FIG. 1D, at top end 78, innermost layer 68 includes lip 28, which extends over outer recycled layer 72 for avoiding contact of outer recycled layer 72 with contents exiting container 58. This is described in greater detail above for preform 10 and the process for making the same.

Naturally, if the inner layer is not multi-layered and is only a single layer of PEN, one can easily vary the thickness of the PEN layer in the same way as for the innermost container layer 68. In accordance with the present invention the PEN barrier layer or the PEN component of a multi-layer may be substantially all PEN or may be a blend with other materials, such as for example, 25–75% PEN and 25–75% of one or more other materials as PET or other barriers.

The multi-layer design of container 58 is advantageous for present day recycling efforts. Specifically, the layers forming container 58 are easily separable by pulling them apart and thus can be divided appropriately for recycling purposes. That is, if a particular material is not recyclable, this will not affect the recyclability of another layer. When more than one material is used, and if the layers do not separate, recycling of containers can be difficult because the materials cannot be separated and properly categorized. With the multi-layer design disclosed herein, such a separation and categorization is achievable, while also allowing material thickness control.

In the preferred embodiment, the outer layer makes up the major portion of the thickness of the preform and the container. Desirably, the inner layer (including the innermost layer, if used) makes up from 5–20% of the thickness of the preform and of the container.

Figure 5:
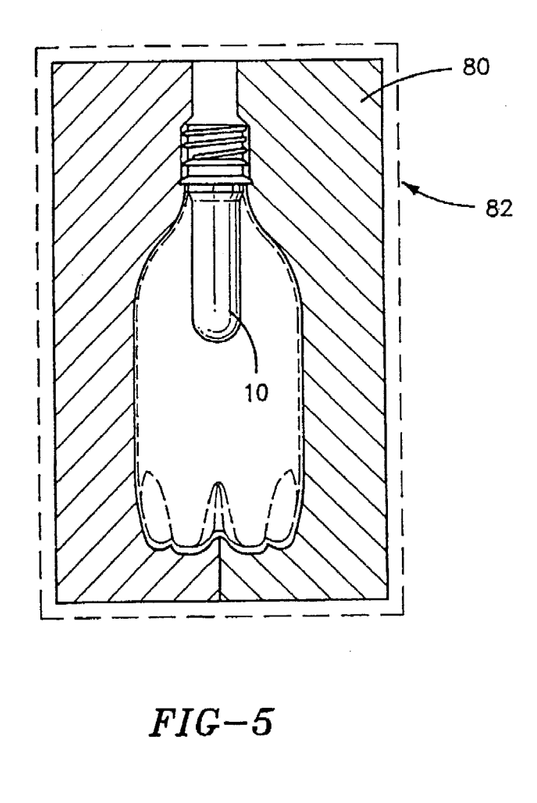
FIG. 5 is an elevational view showing the process of blow molding the preform into the container.

Referring now to FIG. 5, a process for forming container 58 (see FIG. 4) will be described. The process for forming container 58 includes the process described above for forming preform 10. In addition, and referring back to FIGS. 1 and 2, after outer layer 24 is added to liner 53 via injection mold 56, preform 10 is formed and is subsequently removed from injection mold 56. After removal, preform 10 is placed into blow mold 80, shown in FIG. 5. Before placing preform 10 into blow mold 80, it may be necessary to heat the preform. If preform 10 is immediately removed from injection mold 56 and placed into blow molder 82, shown by dotted lines in FIG. 5, preform 10 may be sufficiently heated. Otherwise, preform 10 should be placed into a heater (not shown) prior to placement into blow mold 80. Referring to FIG. 5, preform 10 is placed into blow mold 80 and held securely therein via engagement of the mold with threaded upper portion 12. Once proper placement of the preform is established, blow molder 82 is used to blow preform 10 into the shape of container 58 (see FIG. 4), shown by the dotted lines in FIG. 5. During blowing, the preform is secured in the blow mold via the upper portion 12 of the preform which is maintained free from the blow molding applied to the remaining portions of the preform in forming the container.

Once preform 10 is formed into the container, blow mold 80 is opened and the completed container 58, as shown in FIG. 4, is removed.

Referring to FIGS. 1-5, for both preform 10 and container 58, and via the processes for the formation of each discussed above, two layers can be used instead of three. In this instance, only PEN barrier layers 22 and 70 or blends containing PEN are used and liner 53 is formed only by one layer, barrier layer 20. In this instance, the same process as described above is used for injection molding outer layer 24 over barrier layer 22. The steps for finishing the formation of preform 10 into the container via blow molding are the same as described above. In addition, with regard to the thickness of preform barrier layer 20 and container barrier layer 70, the same relative thicknesses between the portions, discussed above, are preferably used.

With reference to the processes described above for the formation of preform 10 and container 58, these processes can be combined into one process and the process can be automated which would include facilitating a plurality of interconnected stations adapted to perform the steps as described above. Reference is hereby made to U.S. Pat. Nos. 5,244,610 and 5,240,718 disclosing a wheel type plastic blow molding machine combining the steps of preform extrusion and preform blow molding. Each of these patents are assigned to and owned by the Assignee of the present application and the molding device described therein is hereby incorporated herein for use with the instant invention.

A primary advantage of the present invention is that a preform and container, and a process for forming the same, having multiple layers are provided wherein at least one layer has varied thicknesses for different portions of the preform and container having different functions. Thus, for example, one can obtain programmed thickness at different portions of the preform and at different portions of the resultant container, as providing a container which is thicker in the bottom or base area and in the neck portions. This is advantageous for hot-fill applications, e.g., reduction of deformation on filling. Another advantage of this invention is that a preform, and process for forming the same, are provided for forming a container which is highly convenient to recycling. Yet another advantage of this invention is that a preform and container are provided having multiple layers, wherein the inner layer varies in thickness at different portions of the container for accomplishing different functions. Still another advantage of this invention is that a multi-layer preform and container is provided wherein each layer has a specific function such as a barrier layer, a contents contact layer, and a outer aesthetic/functional layer.

The container of the present invention is characterized by surprising and highly advantageous properties. Thus, the container has remarkable heat resistant properties. Thus, for example, a blend of 50% PEN and 50% PET, with recycled PET injected thereover and with the blend comprising 10% of the thickness of the container was hot filled with 193° F. water and surprisingly showed no distortion; whereas the PET mono-layer container showed considerable distortion, and a PET multi-layered container also showed considerable distortion. Thus, the present container is highly useful as a barrier container for hot fill materials. The extruded liner allows one to readily control the thickness of various parts of the container as desired. Also, the container exhibits excellent oxygen and carbon dioxide resistance. Further, the extrusion-injection-blow molding process enables one to obtain desirable biaxial orientation in the container, and indeed to control the amount of orientation due to the extrusion process. Still further, one can create a lighter container with improved properties over a heavier container and thereby obtain a considerable savings in material costs. Still further, one can use the same shaped preform for different shaped containers and with controllable orientation. Also, the container can be prepared using conventional materials.

It is apparent that there has been provided in accordance with this invention multi-layer containers and preforms which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A heat-resistant, multi-layered preform for blow molding a container, which comprises: an extruded inner barrier layer containing polyethylene naphthalate, said inner layer forming a cavity and defining an upper portion adapted to be formed into an upper portion of a container, an intermediate portion adapted to be formed into an intermediate portion of the container, and a base portion adapted to be formed into a base portion of the container; and an outer injection molded layer located substantially adjacent the inner layer and having a base portion, an intermediate portion and an upper portion thereof, wherein the outer layer comprises the major portion of the thickness of the preform and wherein the inner layer has a thickness which differs from the base portion to the upper portion, with the outer layer being thicker than the inner layer and with the thickness of the base and intermediate portions of the outer layer being substantially uniform.

2. The preform of claim 1, wherein the base portion of the inner layer is thicker than the intermediate portion, which in turn is thicker than the upper portion.

3. The preform of claim 1, wherein the outer layer is recycled plastic.

4. The preform of claim 1, wherein the inner layer comprises 5 to 20% of the thickness of the preform.

5. The preform of claim 1, wherein the inner layer consists essentially of polyethylene naphthalate.

6. The preform of claim 1 wherein said preform is characterized by having axial orientation.

7. A heat resistant, multi-layered container, which comprises: an extruded inner barrier layer containing polyethylene naphthalate, said inner layer forming a cavity and defining an upper portion, an intermediate portion and a base portion; and an outer injection molded layer located substantially adjacent the inner layer and substantially coextensive therewith; wherein the inner and outer layers are blow molded and wherein the inner layer has a thickness which differs from the base portion to the upper portion, and wherein the base portion and the upper portion of the inner layer are thicker than the intermediate portion of the inner layer.

8. The container of claim 7, wherein the container has a footed base formed from the base portion of the inner layer and the adjacent outer layer.

9. The container of claim 7, wherein the outer layer is formed from recycled plastic.

10. The container of claim 8, wherein the outer layer includes an upper portion coextensive with the inner layer upper portion, said outer layer upper portion having an external threaded portion.

11. The container of claim 7, wherein said container is biaxially oriented.

12. The container of claim 7, wherein the polyethylene naphthalate layer is a blend containing at least 25% polyethylene naphthalate.

13. The container of claim 7, including at least one additional barrier layer.

14. A heat-resistant, multi-layered preform for blow molding a container, which comprises: an extruded inner barrier layer containing polyethylene naphthalate, said inner layer forming a cavity and defining an upper portion adapted to be formed into an upper portion of a container, an intermediate portion adapted to be formed into an intermediate portion of the container, and a base portion adapted to be formed into a base portion of the container; and an outer injection molded layer located substantially adjacent the inner layer, wherein the outer layer comprises the major portion of the thickness of the preform and wherein the inner layer has a thickness which differs from the base portion to the upper portion, wherein the inner layer is a multi-layered laminate including a central polyethylene naphthalate layer contacting the outer layer and an innermost layer of at least one additional material, wherein the central and innermost layers are co-extruded.

15. A heat-resistant, multi-layered preform for blow molding a container, which comprises: an extruded inner barrier layer containing polyethylene naphthalate, said inner layer forming a cavity and defining an upper portion adapted to be formed into an upper portion of a container, an intermediate portion adapted to be formed into an intermediate portion of the container, and a base portion adapted to be formed into a base portion of the container; and an outer injection molded layer located substantially adjacent the inner layer, wherein the outer layer comprises the major portion of the thickness of the preform and wherein the inner layer has a thickness which differs from the base portion to the upper portion, wherein the inner layer is multi-layered and at least one of the multi-layers consists essentially of polyethylene naphthalate.

16. A heat resistant, multi-layered container, which comprises: an extruded inner barrier layer containing polyethylene naphthalate, said inner layer forming a cavity and defining an upper portion, an intermediate portion and a base portion; and an outer injection molded layer located substantially adjacent the inner layer and substantially coextensive therewith; wherein the inner and outer layers are blow molded and wherein the inner layer has a thickness which differs from the base portion to the upper portion, and wherein the inner layer is a multi-layered laminate including a central polyethylene naphthalate layer contacting the outer layer and an innermost layer of at least one additional material, wherein the central and innermost layers are co-extruded.

17. The container of claim 16, wherein the innermost layer is polyethylene terephthalate.

18. The container of claim 16, wherein the central polyethylene naphthalate layer has a substantially uniform thickness.

* * * * *